US007110371B2

(12) United States Patent
Monroe et al.

(10) Patent No.: US 7,110,371 B2
(45) Date of Patent: Sep. 19, 2006

(54) SYSTEM AND METHOD TO COMMUNICATE BETWEEN A HOST AND A MODEM

(75) Inventors: Daniel R. Monroe, Woodland Park, CO (US); Jay A. Foster, Austin, TX (US); Eric K. Henderson, Cambridge (GB); Richard S. Butler, Colorado Springs, CO (US)

(73) Assignee: Intel Corporation, Santa Clara, CA (US)

( * ) Notice: Subject to any disclaimer, the term of this patent is extended or adjusted under 35 U.S.C. 154(b) by 510 days.

(21) Appl. No.: 10/229,499

(22) Filed: Aug. 28, 2002

(65) Prior Publication Data

US 2004/0042450 A1    Mar. 4, 2004

(51) Int. Cl.
*H04B 7/00* (2006.01)

(52) U.S. Cl. ............... 370/310.2; 370/464; 455/557

(58) Field of Classification Search ............... 370/229, 370/230, 23.1, 231, 232, 235, 324, 329, 350, 370/394, 431, 503, 509, 512, 241.1, 282, 370/310.2, 328, 464, 473; 455/3.03, 3.04, 455/555, 556, 557
See application file for complete search history.

(56) References Cited

U.S. PATENT DOCUMENTS

| | | | | |
|---|---|---|---|---|
| 5,109,393 A | * | 4/1992 | Saegusa | 375/357 |
| 5,128,971 A | * | 7/1992 | Johnson | 375/356 |
| 5,978,386 A | | 11/1999 | Hamalainen et al. | 370/466 |
| 6,038,236 A | * | 3/2000 | Houjou et al. | 370/465 |
| 6,094,575 A | | 7/2000 | Anderson et al. | 455/422 |
| 6,363,335 B1 | | 3/2002 | Monroe et al. | 703/21 |
| 6,425,033 B1 | | 7/2002 | Conway et al. | 710/128 |
| 6,456,614 B1 | * | 9/2002 | Guan et al. | 370/350 |
| 6,603,744 B1 | * | 8/2003 | Mizutani et al. | 370/310 |
| 6,671,284 B1 | * | 12/2003 | Yonge et al. | 370/462 |
| 6,819,686 B1 | * | 11/2004 | Frannhagen et al. | 370/535 |

FOREIGN PATENT DOCUMENTS

WO    WO-99/62229    12/1999

* cited by examiner

*Primary Examiner*—Chi Pham
*Assistant Examiner*—Phuc Tran
(74) *Attorney, Agent, or Firm*—Schwegman, Lundberg, Woessner & Kluth, P.A.

(57) ABSTRACT

A GPRS controller interface communicates commands, events and data between two communication devices using a GPRS transport layer (GTL). In one embodiment, communication devices may include a host and a baseband controller of a modem that communicate over a serial link. Command event and data packets may be framed and multiplexed for transmission over the link. The framing includes, among other things, adding a flag to identify command and event packets from data packets, and a sequence number to help ensure synchronization. A first logical channel may be utilized for command packets including AT modem commands. A second logical channel may be utilized for outbound data packets. A third logical channel may be utilized for event packets, and a fourth logical channel may be utilized for inbound data packets. GTL commands may initiate an initialization or resynchronization of the GCI layer and may be generated, for example, in response to sequence number errors of checkbyte errors.

32 Claims, 6 Drawing Sheets

SYSTEM AND METHOD TO COMMUNICATE BETWEEN A HOST AND A MODEM

TECHNICAL FIELD

The present invention pertains to electronic communications, and in one embodiment, to host and modem communications in a GPRS system.

BACKGROUND

Mobile communication systems have been developed due to the need to allow people to move away from fixed telephone and fixed data communication devices without making it more difficult to reach them. Mobile data transmission is particularly well supported by digital mobile systems, such as the Pan-European mobile system referred to as the global system for mobile communications (GSM). In a GSM network, packet data transmission may be provided between mobile terminals and external data networks by a general packet radio service (GPRS) system, while the GSM network may operate as a voice network. Terminal equipment may communicate with a GSM base station utilizing a mobile station, which may be a GPRS PC modem. Conventionally, a dial-up model is implemented when connecting to a GPRS modem for point-to-point (PPP) communications, however this requires the user to go through a tedious dial-up procedure to establish a GPRS connection. Furthermore, even after establishment of a connection with a GPRS system, the mobile terminal's functionality may be limited due to dial-up connection restrictions. This is undesirable, especially when operating a personal computer where users may desire an always-connected experience similar to the way an Ethernet connection functions.

Currently, the GSM 07.10 Terminal Equipment to Mobile Station (TE-MS) Multiplexer Protocol describes a multiplexing protocol for combining AT commands, circuit switched data, short messaging service (SMS) data and GPRS data on a single serial interface, however this protocol is difficult to implement and may not work well in many operating system environments, including the Microsoft Windows environment. The GSM 07.10 protocol is an overly complex generic interface protocol designed specifically for use on mobile handsets. Thus there is a general need for an improved system and modem/host communication method which may be suitable for use in a GPRS system.

SUMMARY

In some embodiments, a method for communicating over a communication link from a host to a modem is provided. The method comprises multiplexing framed command packets and framed outbound data packets over a communication link from a host to a modem, and receiving framed inbound packets over the communication link from the modem. The framed inbound packets include framed event packets multiplexed with framed inbound data packets.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION

The present invention pertains to electronic communications, and in one embodiment, to communications between a host and a modem, and in another embodiment, to GPRS transport layers and asynchronous protocols for communications over serial interfaces, and in yet another embodiment, to GPRS PC cards. The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

Figure 1:
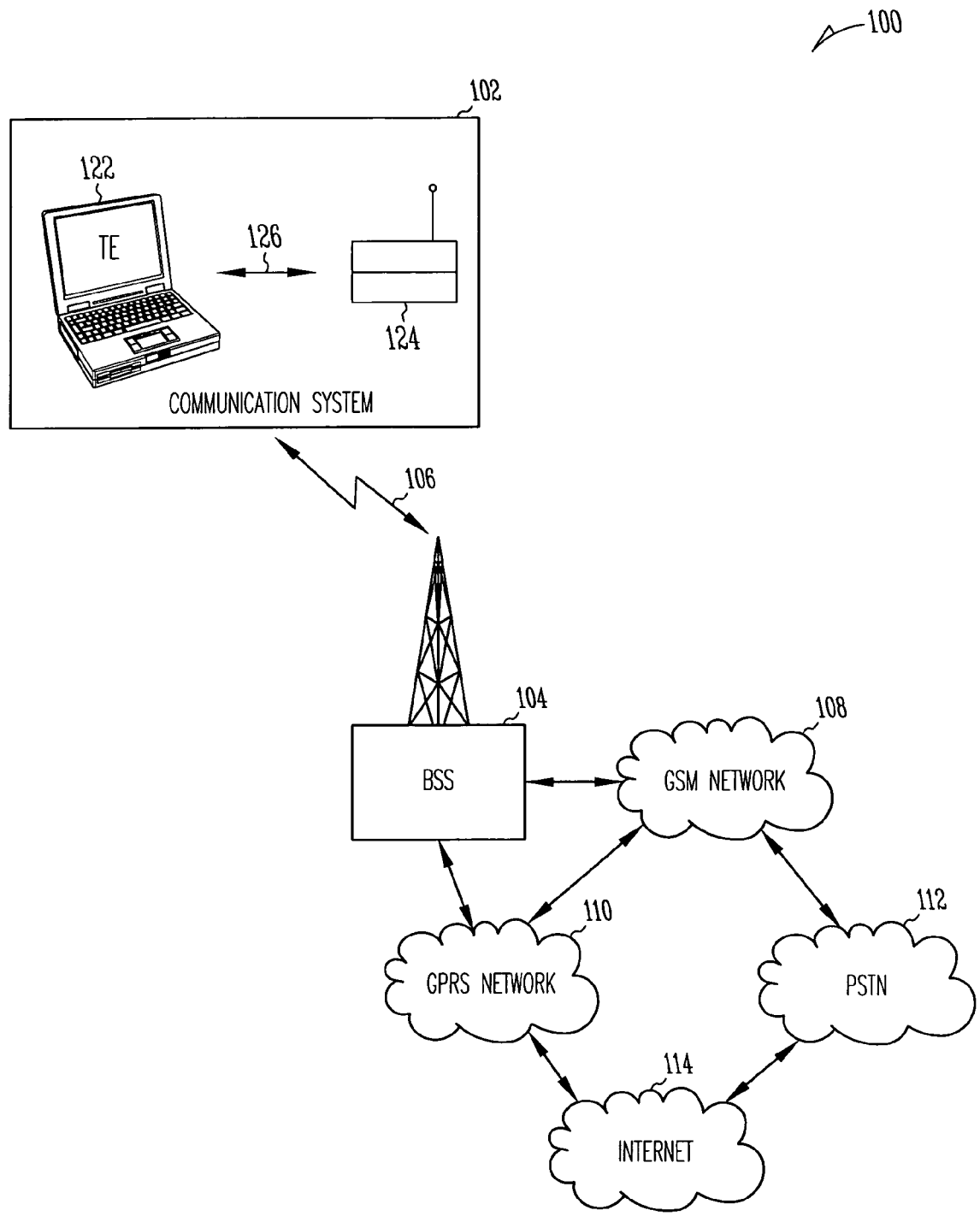
FIG. 1 illustrates a system architecture in accordance with an embodiment of the present invention.

FIG. 1 illustrates a system architecture in accordance with an embodiment of the present invention. System architecture 100 includes communication system 102 which may communicate with base station subsystem (BSS) 104 over wireless link 106. BSS 104 may be coupled with Global System for Mobile Communications (GSM) network 108 and/or General Packet Radio Service (GPRS) network 110. GSM network 108 may provide communication system 102 with GSM services including, for example, telephone services and short messaging services (SMS). GSM network 108 may facilitate communication system 102 in accessing circuit switched networks 112 such as the public switched telephone network (PSTN). GSM network 108 may also facilitate communication system 102 in accessing other external networks, which may include the Internet 114, intranets and data networks. GPRS network 110 may provide communication system 102 with packet radio services and BSS 104 may facilitate communications with external networks which may be packet switched networks including, for example, the Internet 114, intranets and data networks. Although communication system 102 is illustrated in FIG. 1 as operable within a GPRS/GSM type system, in other embodiments of the present invention, communication system 102 may include elements to permit operation within other types of communication systems.

Communication system 102 may be a wireless or wireline communication device and may, for example, be a notebook or laptop computer, a personal digital assistant (PDA), a mobile data terminal, a wireless telephone, digital camera, video camera or other multimedia device, and may include functional combinations thereof. In the embodiment illustrated in FIG. 1, communication system 102 may include one or more radio interfaces for commutating with GSM and/or GPRS systems. In another embodiment, communication system 102 may include a radio interface to communicate in accordance with Code Division Multiple Access (CDMA) techniques. In another embodiment, communication system 102 may include a radio interface to communicate in accordance with local area network (LAN) standards such as the IEEE 802.11(a), 802.11(b) and/or 802.11(g) standards. In another embodiment, communication system 102 may include a radio interface to communicate in accordance with a short-range wireless standard such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In another embodiment, communication system 102 may include a radio interface to communicate in accordance with an ultra-wideband (UWB) communication technique where a carrier frequency is not used. In other embodiments, communication system 102 may include a radio interface to communicate in accordance with an analog communication technique. In another embodiment, communication system 102 may include a radio interface to communicate in accordance with an optical communication technique, which may be in accordance with the Infrared Data Association (IrDA) standard. The radio interface of communication system 102 may provide RF or optical front-end to communicate over wireless link 106 with a communication network.

In one embodiment, communication system 102 may include a terminal equipment (TE) portion 122 and mobile station (MS) portion 124, which may communicate therebetween over one or more serial links such as serial communication link 126. Serial communication link 126 may include a wireline communication link which may be a serial link implementing a RS-232 standard. In other embodiments, serial communication link 126 may be a wireless serial communication link. Communication link 126 may implement a transport layer protocol, such as GPRS transport layer (GTL) protocol, for passing, for example, command, event and data packets between TE portion 122 and MS portion 124.

MS portion 124 may be a modem, PC card, GPRS PC card, etc. and may be suitable for insertion into TE portion 122. MS portion 124 may provide the RF or optical front-end to communicate over wireless link 106 and may include one or more radio interfaces discussed above. In one embodiment, MS portion 124 may be a mobile terminal (MT). Although communication system 102 is illustrated as having one serial communication link 126 between TE portion 122 and MS portion 124, other embodiments of the present invention may include more that one link 126.

In one embodiment, the present invention provides a communication technique for communication between a host (e.g., TE 122) and a baseband microcontroller on a GPRS modem (e.g., MS 124), which may be used over serial communication links therebetween. A GPRS transport layer (GTL) may pass informational packets between the host and the modem. The GTL may be responsible to communicate data packets between the two devices and may help ensure reliable and proper synchronization of the packets. A GPRS controller interface (GCI) may implement a protocol for identifying and formatting command, event and IP data packets as the payload to the GTL.

Figure 2:
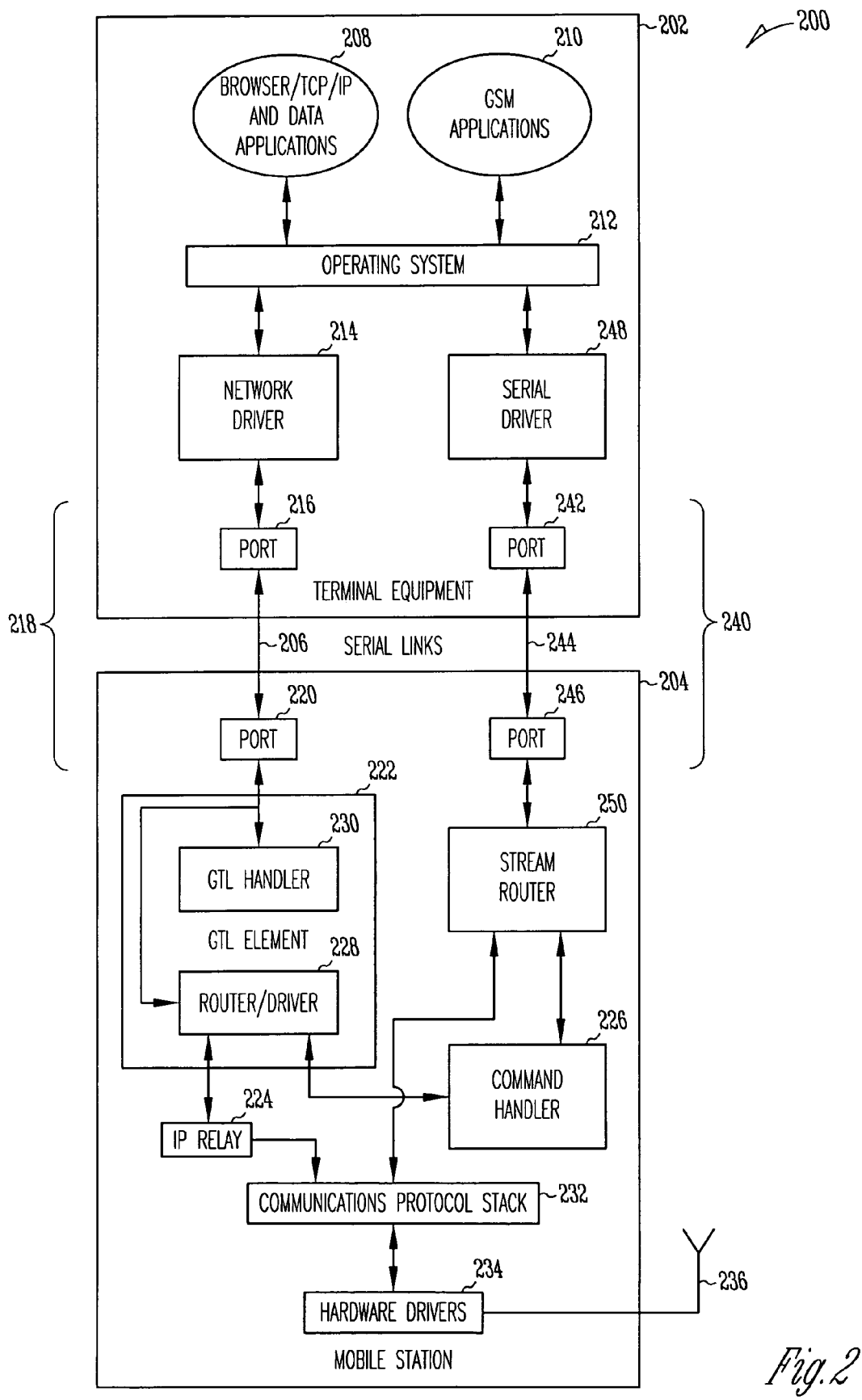
FIG. 2 is a functional block diagram of a communication system in accordance with an embodiment of the present invention.

FIG. 2 is a functional block diagram of a communication system in accordance with an embodiment of the present invention. Communication system 200 may be suitable for use as communication system 102 (FIG. 1) although other communication devices may also be suitable. Communication system 200 may include a terminal equipment (TE) portion 202 and mobile station (MS) portion 204 which may communicate over serial communication link 206. In one embodiment, TE portion 202 may correspond with TE portion 122 (FIG. 1), MS portion 204 may correspond with MS portion 124 (FIG. 1) and serial communication link 206 may correspond with link 126 (FIG. 1).

TE 202 may include applications 208 and applications 210 which may interface and operate with operating system 212. In one embodiment, applications 208 may include applications for performing packet switched communications, while applications 212 may include applications for performing circuit-switched communications. Applications 212 may utilize, for example, block-data based communications. On the other hand, the GTL, which may be implemented for the communications of applications 210 may be independent of the payload type. Applications 208 may include data network communication applications such as TCP/IP type applications such as an Internet browser, and may include a TCI/IP stack. Applications 208 may include applications, which are serviced by a packet radio service system such as GPRS system. Applications 210 may include applications, which are serviced by a GSM type system, and may include short-message-service (SMS) applications as well as voice communication applications. Other applications operating on TE 202 may, for example, relate to TE 202 (e.g., battery level) or relate to a status of link 206 or wireless link 106 (FIG. 1).

Operating system 212 may be a Windows™ operating system (OS), a UniX™ OS, a Palm™ OS, an Apple™ OS, or other operating system including a proprietary operating system. (UNIX™ is a trademark of The Open Group standards body, Palm™ is a trademark of Palm, Inc., Windows is a trademark of Microsoft, Corp., Apple™ is a trademark of Apple Computer, Inc.) Operating system 212 may interface with network driver 214 for receiving and transmitting packets from and to port 216. In one embodiment, network driver 214 may be a network driver interface specification (NDIS) LAN driver when for example, operating system 212 is a Windows operating system. In some of the examples described herein, TE 202 may be viewed as a host or host computer, however these examples are not intended to limit the applicability of the embodiments of the present invention to hosts.

Network driver 214 may frame outbound data packets received from operating system 212 in accordance with a GTL packet format described herein to communicate the data packets over serial link 206. Network driver 214 may also receive and/or generate AT command-language commands for controlling modem operations of MS 204. Network driver 214 may also generate GCI commands for controlling communications over serial link 206 and configuring port 216 for such communications. Network driver 214 may frame commands into command packets in accordance with the GTL packet format.

Network driver 214 may also receive event packets and inbound data packet from port 216 which may be framed in accordance with the GTL packet format. Framing on received packets may be removed and the packets may be passed to operating system 212. Event packets may have been generated by a baseband controller of MS 204 and may signify a completion of a command, indicate a status of a command, or indicate an unsolicited event. Event packets may also include a packet-flow-control command to instruct TE 202 to either refrain from sending packets or to begin sending packets.

In one embodiment, network driver 214 may generate a protocol initialization command packet that includes an initialization command for initializing interface 218. Interface 218 may include serial communication link 206, serial port 216 and serial port 220. Network driver 214 may frame the protocol initialization command packet, and send the framed protocol initialization command packet to MS 204 over serial interface 218. MS 204 may respond to the protocol initialization command packet at least by resetting sequence numbers for logical channels and by sending an event packet to indicate completion of the initialization command. The initialization may also include setting a maximum packet payload size for communications over interface 218.

Network driver 214 may also include a multiplexer to multiplex the framed command packets and the framed outbound data packets for transmission over serial communication link 206. The framing performed by network driver 214 may include adding a flag, a sequence number, a payload length and a check field to a command packet or an outbound data packet. The flag may identify whether the packet is a command packet or a data packet.

In accordance with embodiments of the present invention, communications may take place over interface 218 utilizing a plurality of logical channels. The logical channels may include a first logical channel to communicate the outbound data packets from the host to the modem, and a second logical channel to communicate the command packets from the host to the modem, a third logical channel to communicate the inbound data packets from the modem to the host, and a fourth logical channel to communicate the event packets from the modem to the host. Sequence numbers may be used to facilitate the identification of communication errors by enforcing sequential ordering. In one embodiment, sequence numbers may be used to indicate sequential packets communicated over the logical channels. For example, packets communicated over the first logical channel may have sequential sequence numbers, and packets communicated over the second logical channel may also have sequential sequence numbers.

Network driver 214 may check the sequence number for a received packet and may resynchronize communications with interface 218 when an invalid sequence number is received. As part of re-synchronizing, network driver may generate a protocol initialization command packet that includes an initialization command, may frame the protocol initialization command packet, and may send the framed protocol initialization command packet to MS 204. MS 204 may respond to the protocol initialization command packet at least by resetting the sequence number for a plurality of logical channels and by sending an event packet to the host to indicate completion of the initialization command. In one embodiment, network driver 214 may also initiate resynchronization when a check byte of a packet is incorrect.

Network driver 214 may also generate a host packet-flow-control-off command packet to instruct the modem to refrain from sending packets to the host. The host packet-flow-control-off command packet may be framed to indicate it is a command packet. The modem may be responsive to receipt of the host packet-flow-control-off command packet by refraining from sending further framed packets to the host over communication link 206. Network driver 214 may also wait for receipt of a packet-flow-control-on command from the modem before sending additional multiplexed framed packets over serial communication link 206.

MS 204 may be a viewed as a modem, and in one embodiment, may be a GPRS modem and may take the form of a PC card. MS 204 includes serial port 220 which may receive framed event and inbound data packets from GTL element 222 and may provide framed control and outbound data packets from link 206 to GTL element 222. GTL element 222 may operate as a functional element of a baseband controller or baseband microcontroller of the modem. GTL element 222 determines whether a packet received from port 220 is a command packet or a data packet. Router/driver 228 may remove framing from the received packets, may route data packets to IP relay element 224, and may route command packets to command handler 226 using router/driver 228. GCI commands for controlling communications over serial link 206 may be processed by GTL handler 230. Router/driver 228 may also frame inbound data packets received from IP relay 224 and event packets received from command handler 226. The framing performed by GTL element 222 may include adding a flag, a sequence number, a payload length and a check field to an event packet and/or an inbound data packet. The flag may identify whether the packet is an event packet or a data packet. In one embodiment, GTL element 222 may include a multiplexer to multiplex the framed event packets and the framed inbound data packets for transmission over serial communication link 206 to TE 202.

GTL handler 230 may respond to protocol initialization commands sent by TE 202 and may reset sequence numbers for re-synchronizing communications with TE 202 over interface 218. GTL handler 230 may also generate protocol initialization events when a packet is received out of order to resynchronization and/or reinitialize interface 218.

IP relay element 224 may relay IP data packets between GTL element 222 and communication protocol stack 232. Command handler 226 may process commands such as AT commands. MS 204 may also include hardware drivers 234 which may interface with hardware elements, such as radio interfaces, for communication over wireless links, such as link 106 (FIG. 1) utilizing antenna 236. In a GPS/GPRS embodiment, communication protocol stack 232 may include elements normally associated with a GSM/GPRS communication stack, including, for example, GPRS layers, data services and GSM layers.

In one embodiment, communication system 200 may utilize an optional second serial communication interface 240, which may include serial port 242, serial link 244 and serial port 246. Second communication interface 240 may utilize serial drivers 248 and 250 and may provide an alternate communication path between terminal equipment 202 and MS 204. This interface may provide a standard GSM 07.07 AT command interface and may be referred to as the "R" interface. In one embodiment, second communication interface 240 may be used for certain applications that utilize circuit-switched communications. For example, second communication interface 240 may be used for certain connection-oriented applications that rely on legacy interfaces.

Although terminal equipment 202 and mobile station 204 are illustrated as having separate functional elements, various combinations of hardware and software may implement such functional elements. For example, processors configured with software and firmware may implement some of the functional elements illustrated, while other elements may be implemented by hardware. Furthermore, nothing prohibits some of the functional elements from being combined.

Figure 3:
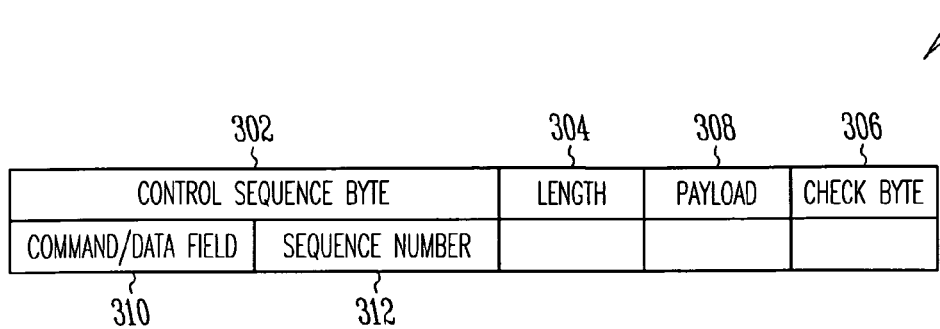
FIG. 3 illustrates the format of a transport layer packet in accordance with an embodiment of the present invention.

FIG. 3 illustrates the format of a transport layer packet in accordance with an embodiment of the present invention. Transport layer packet 300 illustrates a packet format suitable for communications over interface 218 (FIG. 2) although other packet formats may also be suitable. In accordance with embodiments of the present invention, packets are framed for communications over interface 218 (FIG. 2). The framing may include adding control sequence byte (CSB) 302, length 304 and check byte 306 to payload 308. The payload may be an inbound or outbound IP data packet, a command or an event.

CSB 302 may include data/command field 310 (e.g., a flag) to indicate whether the payload data carries a command or data packet. In one embodiment, when field 310 is clear, payload 308 may be a command packet from the host (e.g., TE 202 (FIG. 2)) to a baseband controller of the modem (e.g., MS 204 (FIG. 2)). In this embodiment when field 310 is clear, payload 308 may also be an event packet being sent from the modem to the host. In one embodiment, when field 310 is set, payload 308 may be an outbound or inbound data packet. CSB 302 may also include sequence number field 312 which may include a sequence number associated with the packet. The sequence number may be associated with a particular logical channel for tracking packets for the associated logical channel. Sequence numbers may help ensure synchronization between TE 202 (FIG. 2) and MS 204 (FIG. 2).

Length 304 may include, for example, a value that defines the length of payload 308. Payload 308 may be an inbound or outbound data packet, or may be a command or event. Check byte 306 may be used to identify an end of packet 300. For example, check byte 306 may be the one's compliment of CSB 302 so that when CSB 302 is XOR'ed with check byte 306, a predetermined value, such as 0×FF may be generated. When check byte 306 of a packet is incorrect, a resynchronization may be initiated between TE 202 (FIG. 2) and MS 204 (FIG. 2).

In one embodiment, when either the host or the baseband controller detects a sequence number mismatch or a check byte error, then a recovery mechanism may be initiated. This recovery mechanism may be applied to some or all logical channels, not only the logical channel on which the error was detected. The recovery mechanism may allow the transport layer to be reset on both the host and the baseband controller without resetting other firmware operating within the baseband controller. When a sequence number mismatch or the check byte error is detected, the side that detected the error (e.g., either the host or baseband controller) may send a stream of predetermined bytes to signify to the other side that an error has been detected. The stream of predetermined bytes may, for example, comprise a stream of thirty (30) null (0×00) bytes, which are easily recognizable. In response to receipt of the stream of predetermined bytes, the host and baseband controller may reset their sequence counters for the logical channels so that the next packet sequence number used may be a one. The host may discard any pending AT commands. The baseband controller may discard any pending command complete events for outstanding AT commands. Other packets (e.g., those not discarded) may be sent after completing the reset of the GTL. In other words, if the host has sent an AT command to the baseband controller and is waiting for a response, then the AT command is resent after resetting the GTL. The baseband controller may wait for a protocol initialization command message from the host software, and may respond with a command complete event message. Once the host receives the command complete message (e.g., as part of an event packet), the host and modem may resume communications therebetween over serial link 206.

In accordance with embodiments of the present invention, the GCI layer provides a protocol for commands, events and data that are exchanged between a host and a baseband controller. Accordingly, command packets, event packets and data packets are defined in the GCI layer. A command packet may send commands to the baseband controller from the host. For some commands, a command complete event is sent to the host when the baseband controller completes the command. Some commands may not receive a command complete event but may receive a command status event. The baseband controller may send a command status event back to the host when the baseband controller receives one of these commands and has begun to execute the command. Some commands may not receive any kind of event at all. For commands that expect to receive a command complete event or a command status event, but do not receive either of these events, a timeout (e.g., thirty (30) seconds) may be used.

A GCI command packet may use an elastic format to allow for future expansion as well as conserve space. A GCI command packet may include a command opcode that may contain the command being sent to the baseband controller from the host. A command may have a different opcode number assigned to it. The interpretation of the rest of the packet may depend on the opcode. A GCI command packet may also include parameters following the opcode that are specific to the particular opcode. The parameters may occupy the remainder of the packet. A GCI command packet may be included as payload 308 of transport layer packet 300.

A baseband controller may notify a host when an event occurs using a GCI event packet. In general, an event may be a response to a command packet, or an unsolicited event, such as an incoming call ring signal. The length of the event packet may be determined from length field 304. A maximum length for both command and event packets may be predetermined (e.g., 1024 bytes). A GCI event packet may include an event opcode that may contain the event being sent to the host from the baseband controller. Events may have a different event opcode number assigned to it. The interpretation of the rest of the packet may depend on the event opcode. A GCI event packet may also include parameters following the opcode that are specific to the particular opcode. The parameters may occupy the remainder of the packet. The GCI event packet may be included as payload 308.

In one embodiment, a GCI data packet may be used to exchange network data packets, such as GPRS packets, between the host and baseband controller. The packets may be passed in both directions. For example, inbound packets may be received from a GPRS network and are sent from the baseband controller to the host. Outbound packets to be sent to the GPRS network may be sent from the host to the baseband controller. The GCI data packet may use an elastic format to allow for future expansion and conserve space. The length of the data packet may be determined from length field 304 of GTL packet 300. The data packet may be included as payload 308 of transport layer packet 300.

In one embodiment, initialization of the GCI layer may be accomplished using a GCI protocol initialization command. This command may allow the host and the baseband controller to negotiate the maximum GCI data packet payload size. It may also be used for initial synchronization of the host and the baseband controller. After the GCI protocol initialization command is sent by the host to the controller and a corresponding command complete event is completed, the two sides may be ready for communications.

AT commands may be sent to the baseband processor using a GCI command packet with a predetermined command opcode, such as a raw-AT-ASCII command opcode. The corresponding response from the baseband processor may be sent to the host using a GCI event packet with an event opcode such as command-complete-event opcode indicating that the command has been completed. The response string for an AT command may be contained in one event packet and does not need to be split across multiple event packets.

In one embodiment of the present invention, a mechanism for controlling the flow of data packets from the host to the baseband controller and vice versa may be implemented. Command packets may be used to turn on and turn off the flow of data packets. In this embodiment, the baseband controller may send controller-flow-on and controller-flow-off events to the host to enable and disable the flow of data packets from the host to the controller. When the host receives a controller-flow-off event, the host may wait until a controller-flow-on event is received before sending any more data packets to the controller. Data packets sent prior to receiving a controller-flow-off event may not need to be resent after the controller-flow-on message is received. Similarly, the host may send host-flow-on and host-flow-off commands to the baseband controller to control the flow of data packets from the controller to the host.

GCI commands may include a GCI protocol initialization command to initialize communication interface 218 (FIG. 2), which may include negotiating a maximum size of GCI packets. Initialization may also include resetting sequence numbers. GCI commands may also include a raw-AT-ASCII command opcode for sending AT commands to the baseband controller. GCI commands may also include host-flow-on and host-flow-off commands discussed above. GCI commands may also include a GCI link check command to allow the host to query the baseband controller to determine the status of the link, such as link 206 (FIG. 2). When the link is operating satisfactorily, the baseband controller may immediately return a command complete event. In one embodiment, GCI commands may have a unit opcode identifying the command. GCI events may include a command complete event, which may signify the completion of a command issued to the baseband controller using a GCI command packet. The details of the return parameters may be specific to the command. GCI events may also include a command status event, which may signify the status of a command issued to the baseband controller using a GCI command packet. The details of the return parameters may be specific to the command. GCI events may also include unsolicited events, which may be described by an ASCII text string. An example of an unsolicited event includes a ring signal for an incoming voice call.

Figure 4:
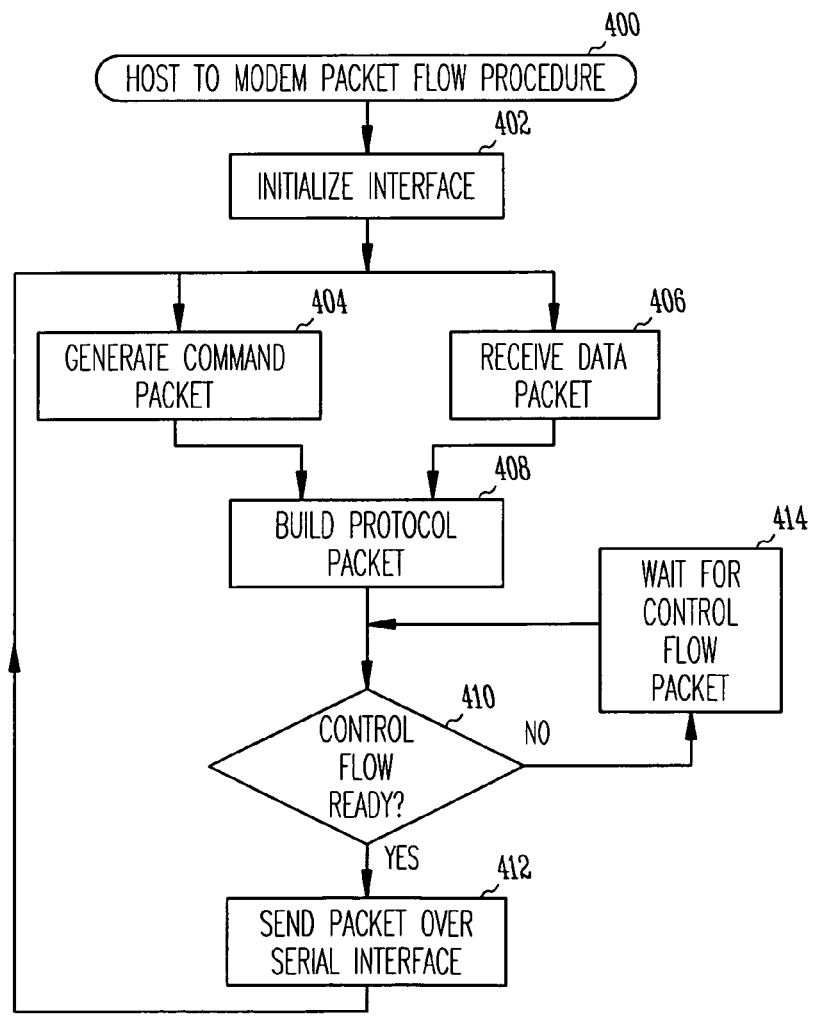
FIG. 4 is a flow chart of a host to modem packet flow procedure in accordance with an embodiment of the present invention.

FIG. 4 is a flow chart of a host to modem packet flow procedure in accordance with an embodiment of the present invention. Procedure 400 may be performed by a host, such as terminal equipment 202 (FIG. 2) although other devices may be suitable for performing procedure 400. Although the individual operations of procedure 400 are illustrated and described as separate operations, one or more of the individual operations may be performed concurrently and nothing requires that the operations be performed in the order illustrated. In operation 402, an initialization of a serial interface between the host and a baseband processor of a modem is performed. As part of operation 402 a protocol initialization command packet may be generated that includes an initialization command. The protocol initialization command packet may be framed in accordance with the GTL, and the framed protocol initialization command packet may be sent to the modem over the serial interface. The modem may respond to the protocol initialization command packet by setting a maximum packet size. The modem may also reset sequence numbers for the logical channels and may send a command complete event packet to the host to indicate completion of the initialization command.

Operation 404 includes generating command packets, and operation 406 includes receiving outbound data packets. The outbound data packets may be received from an operating system of the host. Operation 408 includes building (e.g., framing) the command packets from operation 404 and data packets from operation 406. The building may include generating a packet such as GTL packet 300 (FIG. 3) and may include adding a flag, a sequence number, a payload length and a check field. The flag may identify whether the packet is a command packet or a data packet. Operation 410 includes checking whether a control flow status is on. When the control flow status is on, operation 412 may send the framed packets to the serial interface for transmission to the baseband processor of the modem. Operation 410 may include multiplexing the GTL command packets with the GTL outbound data packets. Operation 410 may also include sending the GTL command packets on a separate logical channel than the GTL outbound data packets.

When the control flow status is off, operation 414 is performed. In operation 414, the host may wait until a controller-flow-on event is received from the modem, which may cause the control flow status to be changed from off to on. During the performance of procedure 400, in addition to transmitting GTL commands and outbound data packets over a serial link, the host may also be receiving GTL events and inbound data packets over the serial link. In one embodiment, the initialization of operation 402 may include performing operations 404 and 412 for an initialization command.

Figure 5:
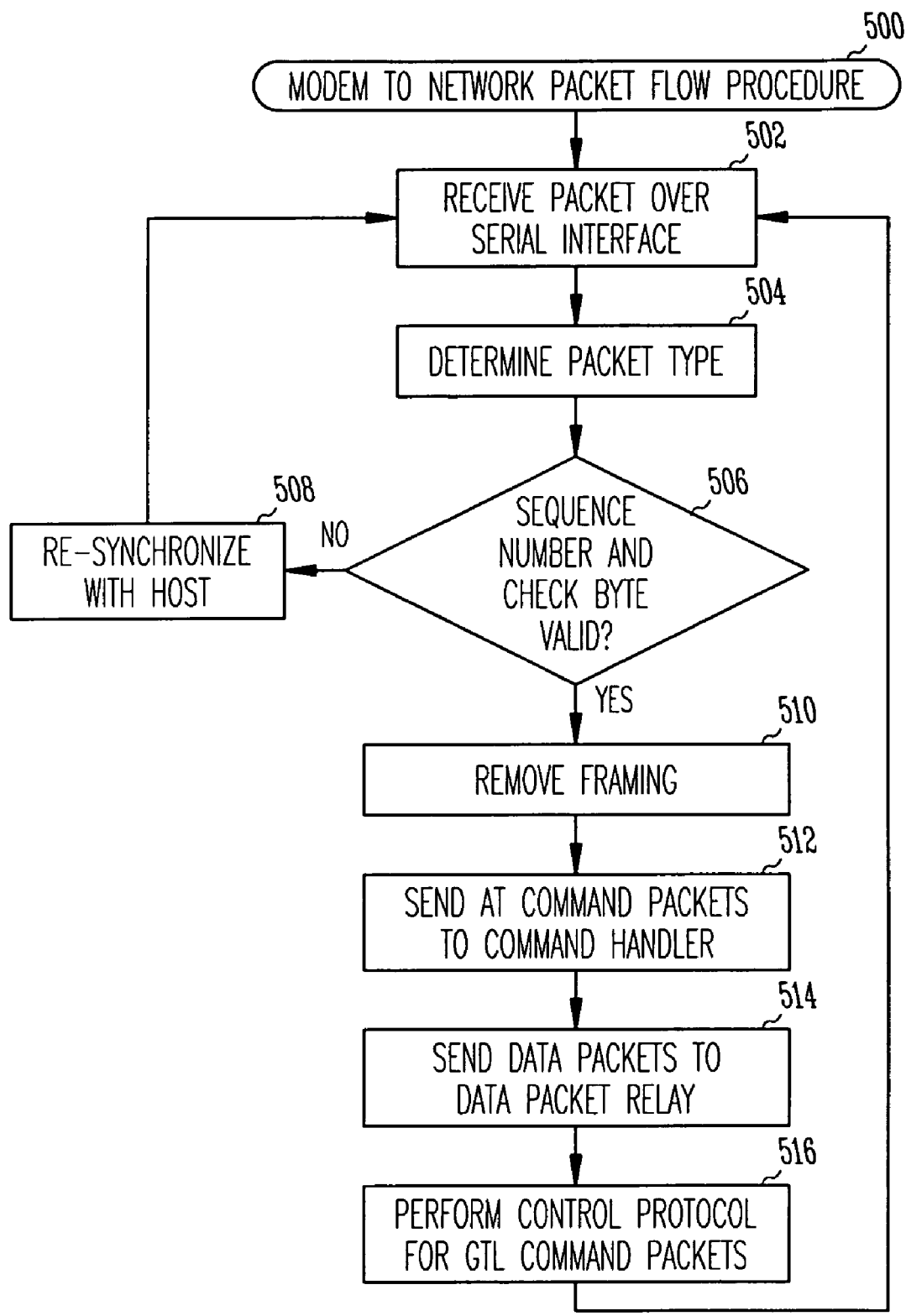
FIG. 5 is a flow chart of a modem to network packet flow procedure in accordance with an embodiment of the present invention.

FIG. 5 is a flow chart of a modem to network packet flow procedure in accordance with an embodiment of the present invention. Procedure 500 may be performed by a modem, which may be part of mobile station 204 (FIG. 2), although other devices may be suitable for performing procedure 500. Although the individual operations of procedure 500 are illustrated and described as separate operations, one or more of the individual operations may be performed concurrently and nothing requires that the operations be performed in the order illustrated. In operation 502, a GTL packet is received over the serial interface, and in operation 504, the baseband processor may determine whether the GTL packet is a command packet or a data packet. Operation 504 may use a flag, such as a flag byte in field 310 (FIG. 3) of GTL packet 300 (FIG. 3) to determine whether the packet is a command or data packet. In operation 506, a sequence number may be checked for the particular logical channel and the control sequence byte (CSB) may be checked. When either the sequence number or CSB fail to verify, operation 508 may be performed. In operation 508, a resynchronization process may be initiated for the serial interface. Operation 508 may include sending an event to the host to initiate resynchronization.

When the sequence number and CSB are valid, operation 510 is performed. In operation 510, the framing may be removed from the packet, which may include removing the flag, the sequence number and the check field. In operation 512, AT command packets are sent to a command handler for processing. In operation 514, outbound data packets are sent to an IP relay and may be forwarded to a network, such as GPRS network 110 (FIG. 1). In operation 516, the baseband controller may respond to GTL command packets, which may include a GCI protocol-initialization command, a host-flow-on command, a host-flow-off command, and/or a GCI link-check command. Upon the completion of operations 512 through 516, procedure 500 may be repeated for a next packet. If the baseband processor is unable to accept additional data packets, it may generate and send a controller-flow-off event to the host. Note that during the performance of procedure 500, in addition to receiving GTL command and outbound data packets over the serial link, the baseband processor may also be sending GTL event and inbound data packets over the serial link to the host.

Figure 6:
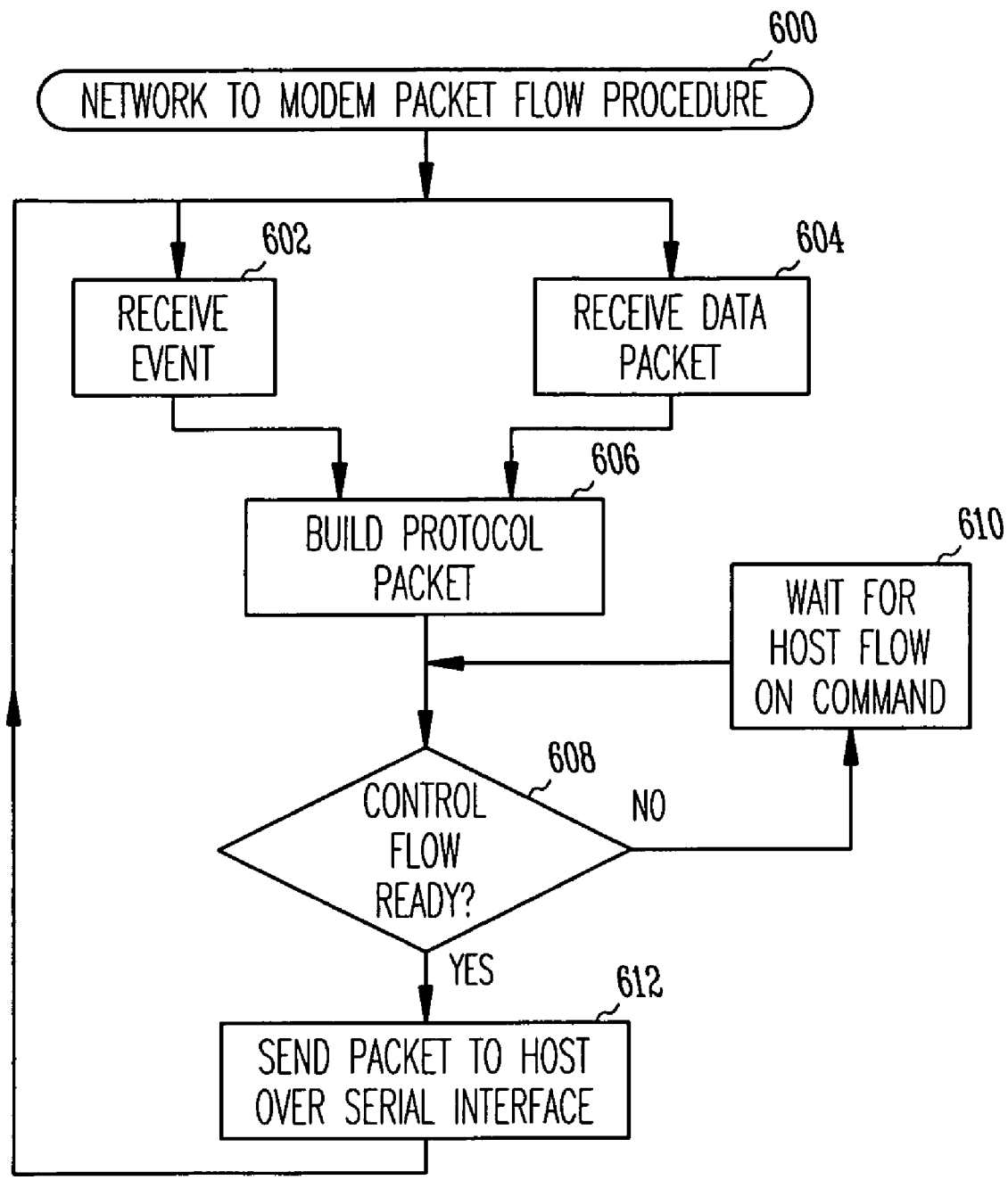
FIG. 6 is a flow chart of a network to modem packet flow procedure in accordance with an embodiment of the present invention.

FIG. 6 is a flow chart of a network to modem packet flow procedure in accordance with an embodiment of the present invention. Procedure 600 may be performed by a modem, which may be part of mobile station 204 (FIG. 2), although other devices may be suitable for performing procedure 600. Although the individual operations of procedure 600 are illustrated and described as separate operations, one or more of the individual operations may be performed concurrently and nothing requires that the operations be performed in the order illustrated. In operation 602, an event may be generated or received, and in operation 604, an inbound data packet may be received. The inbound data packet may be received from a network, such as GPRS network 110 (FIG. 1). In operation 606, a GTL protocol packet is built (e.g., framed) wherein a flag, a sequence number and a CSB may be added to the inbound data packet or event packet. In operation 608, the control flow status is checked to determine if the host is ready to receive GTL packets. If the host is not ready, operation 610 may wait for receipt of a host-flow-on command from the host. When the host is ready to receive GTL packets, operation 612 may send the GTL packet over the serial interface. Operation 612 may include multiplexing the GTL event packets with GTL inbound data packets.

Figure 7:
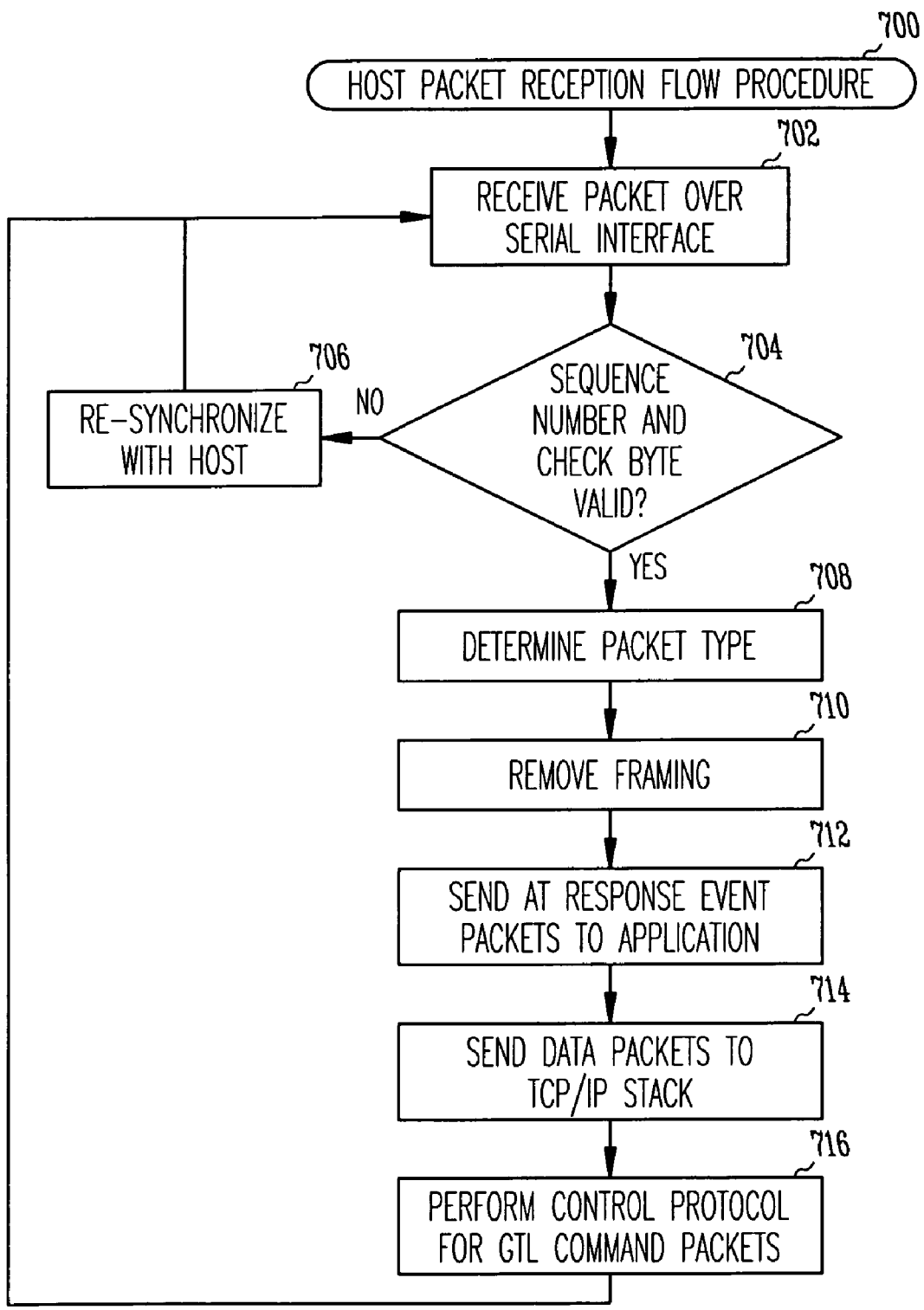
FIG. 7 is a flow chart of a host packet reception procedure in accordance with an embodiment of the present invention.

FIG. 7 is a flow chart of a host packet reception procedure in accordance with an embodiment of the present invention. Procedure 700 may be performed by a host, such as terminal equipment 202 (FIG. 2) although other devices may be suitable for performing procedure 700. Although the individual operations of procedure 700 are illustrated and described as separate operations, one or more of the individual operations may be performed concurrently and nothing requires that the operations be performed in the order illustrated. In operation 702, a GTL packet is received over a serial interface. Operation 704 checks the sequence number and/or the CSB and when either the sequence number or CSB are not valid, a resynchronization may be initiated in operation 706. Operation 708 determines whether the packet is a command packet or an inbound data packet, and the framing may be removed in operation 710. Operation 712 may send event packets to the appropriate application, operation 714 may send inbound data packets to a TCP/IP stack, and operation 716 may initiate performing a GTL command for GTL command packets.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method comprising:
multiplexing packet-switched communications comprising framed command packets within a first logical channel and framed outbound data packets within a second logical channel for transmission over a first communication link from a host to a modem;
receiving framed inbound packets over the first communication link from the modem, the framed inbound packets including framed event packets within a third logical channel multiplexed with framed inbound data packets within a fourth logical channel; and
providing circuit-switched communications including attention (AT) commands from the host to the modem over a second communication link.

2. The method of claim 1 wherein the modem includes a baseband processor, a stream router, a communications protocol stack,
wherein the baseband processor removes framing from the received packets, routes the command packets to a command handler, and routes the outbound data packets to a data packet relay,
wherein the stream router provides the AT commands to the command handler, and
wherein the communications protocol stack receives the outbound data packets from the data packet relay and receives the circuit-switched communications from the stream router.

3. The method of claim 2 further comprising framing command packets and outbound data packets to generate the framed command packets and the framed outbound data packets, and
wherein framing includes adding a flag, a sequence number, a payload length and a check field to a packet, the flag to identify whether the packet is one of the command packets or one of the outbound data packets,
wherein the sequence number indicates sequential packets the logical channels.

4. The method of claim 3 further comprising:
communicating over the first communication link using a plurality of logical channels between the modem and the host, wherein the logical channels include:
a first logical channel to communicate the outbound data packets from the host to the modem; and
a second logical channel to communicate the command packets from the host to the modem and
wherein framing includes adding a flag and a sequence number to a packet, the flag to identify whether the packet is one of the command packets or one of the outbound data packets, the sequence number indicating sequential packets of one of the logical channels.

5. The method of claim 4 wherein the logical channels further include:
a third logical channel to communicate the inbound data packets from the modem to the host; and
a fourth logical channel to communicate the event packets from the modem to the host.

6. The method of claim 3 further comprising verifying the sequence number of at least one of the received framed inbound packets, and performing a resynchronization with the modem when the sequence number fails to verify.

7. The method of claim 6 wherein resynchronization includes:
generating a protocol initialization command packet that includes an initialization command;
framing the protocol initialization command packet; and
sending the framed protocol initialization command packet to the modem over the first communication link, the modem being responsive to the protocol initialization command packet by resetting the sequence number for a logical channel and sending an event packet to the host to indicate completion of the initialization command.

8. The method of claim 3 further comprising:
generating a host packet-flow-control-off command packet to instruct the modem to refrain from sending packets to the host,
wherein framing comprises setting a flag to identify the host packet-flow-control-off command packet as one of the command packets, the modem being responsive to receipt of the host packet-flow-control-off command packet by refraining from sending further framed packets to the host over the first communication link.

9. The method of claim 2 further comprising:
wherein the multiplexing comprises sending the multiplexed framed packets over the first communication link, and
wherein the method further comprising checking a packet-flow-control command status prior to sending the multiplexed framed packets over the communication link.

10. The method of claim 9 further comprising refraining from sending multiplexed framed packets over the first serial communication link when the packet-flow-control command status indicates to refrain from sending packets.

11. The method of claim 9 further comprising refraining from sending the multiplexed framed packets over the first communication link when a packet-flow-control-off command is received from the modem, and waiting for receipt of a packet-flow-control-on command from the modem before sending the multiplexed framed packets over the first communication link.

12. The method of claim 2 wherein the circuit-switched communications include global system for mobile (GSM) communications, and
wherein the packet-switched communications include general packet radio system (GPRS) transport layer communications.

13. A method comprising:
multiplexing framed command packets and framed outbound data packets over a communication link from a host to a modem;
receiving framed inbound packets over the communication link from the modem, the framed inbound packets including framed event packets multiplexed with framed inbound data packets;
initializing a controller interface between the host and the modem, wherein initializing includes:
generating a protocol initialization command packet that includes an initialization command;
framing the protocol initialization command packet; and
sending the framed protocol initialization command packet to the modem over the communication link, the modem being responsive to the protocol initialization command packet at least by resetting a sequence number for a plurality of logical channels and by sending an event packet to the host to indicate completion of the initialization command.

14. The method of claim 13 wherein initializing further includes setting a maximum packet payload size for communications over a communication interface, wherein the communication interface includes the communication link and first and second serial ports, and wherein the first serial port is coupled with the host, and the second serial port is coupled with the modem.

15. A modem comprising:
a first serial port to receive packet-switched communications comprising framed command packets within a first logical channel and framed outbound data packets within a second logical channel from a host over a first serial communication link; and
a baseband processor to remove framing from the received packets, to route the command packets to a command handler, and to route the outbound data packets to a data packet relay;
a second serial port to receive circuit-switched communications and attention (AT) commands from the host over a second serial communication link; and
a stream router to provide the AT commands to the command handler.

16. The modem of claim 15 further comprising a communications protocol stack to receive the outbound data packets from the data packet relay and to receive the circuit-switched communications from the stream router.

17. The modem of claim 16 wherein the baseband processor frames inbound data packets and event packets and sends the framed event packets over the first serial link to the host within a third logical channel, and sends the framed inbound data packets over the first serial link to the host within a fourth logical channel,
wherein sequence numbers indicate sequential packets of the logical channels.

18. The modem of claim 17 wherein the circuit-switched communications include global system for mobile (GSM) communications, and
wherein the packet-switched communications include general packet radio system (GPRS) transport layer communications.

19. A modem comprising:
a serial port to receive framed command packets and framed outbound data packets from a host over a serial communication link; and
a baseband processor to remove framing from the received packets, to route the command packets to a command handler, and to route the outbound data packets to a data packet relay,
wherein the baseband processor frames inbound data packets and event packets and sends the framed inbound and event packets over the serial link to the host,
wherein the baseband processor validates a sequence number and a check byte of the received framed command packets and framed outbound data packets, and initiates a resynchronization with the host when either the sequence number or the check byte does not validate,
wherein removing framing by the baseband processor comprises removing a flag, the sequence number and the check byte from a framed command packets and framed outbound data packets.

20. The modem of claim 19 wherein as part of the framing, the baseband processor adds a flag, a sequence number and a check byte to the inbound data packets and event packets, the flag indicating whether the framed packet is an event packet or a data packet.

21. The modem of claim 20 wherein the baseband processor refrains from sending the framed inbound and event packets over the serial link to the host when a host-control-flow-off command is received from the host over the serial link, the host-control-flow-off command being received in a framed command packet multiplexed with framed outbound data packets from the host over the serial communication link.

22. The modem of claim 21 wherein the modem is part of a personal computer (PC) card locatable within the host to provide data and voice communications with a general packet radio service (GPRS) system utilizing a global system for mobile communications (GSM) system as an access network.

23. A system comprising:
a host;
a modem;
a first serial communication link coupling the host and the modem to communicate packet-switched communications comprising command packets within a first logical channel, event packets within a second logical channel, inbound data packets within a third logical channel and outbound data packets within a fourth logical; and
a second serial communication link coupling the host and the modem to communicate circuit-switched communications and attention (AT) commands,
wherein the host includes a network driver to frame the command packets and the outbound data packets, and multiplex the framed command packets and the framed outbound data packets for transmission over the first serial communication link within the associated logical channels.

24. The system of claim 23 wherein the host receives framed inbound packets over the first communication link from the modem, the framed inbound packets including framed event packets within the second logical channel multiplexed with framed inbound data packets within the third logical channel,
wherein sequence numbers indicate sequential packets of the logical channels.

25. The system of claim 24 wherein the host includes a baseband processor and a command handler, and a stream router,
wherein the baseband processor to removes framing from the packets received over the first serial communication link, routes the command packets to the command handler, and routes the outbound data packets to a data packet relay, and
wherein the stream router provides the AT commands to the command handler.

26. The system of claim 25 wherein the modem includes a communication protocol stack to prepare the outbound data packets for transmission over a wireless communication link to an external network, and
wherein the communications protocol stack receives the outbound data packets from the data packet relay and receives the circuit-switched communications from the stream router.

27. The system of claim 26 wherein the circuit-switched communications include global system for mobile (GSM) communications, and wherein the packet-switched communications include general packet radio service (GPRS) transport layer communications.

28. A system comprising:
a host;
a modem; and
a serial communication link coupling the host and the modem to communicate command packets, event packets, inbound data packets and outbound data packets therebetween over associated logical channels,
wherein the host includes a network driver to frame the command packets and the outbound data packets, and multiplex the framed command packets and the framed outbound data packets for transmission over the serial communication link,
wherein the host initializes a controller interface between the host and the modem by generating a protocol initialization command packet that includes an initialization command, by framing the protocol initialization command packet, and by sending the framed protocol initialization command packet to the modem over the communication link,
the modem being responsive to the protocol initialization command packet at least by resetting a sequence number for the logical channels and by sending an event packet to the host to indicate completion of the initialization command.

29. An article comprising a storage medium having instructions stored thereon that when executed by a computing platform result in:
framing packet-switched communications comprising command packets and outbound data packets;
multiplexing the framed command packets within a first logical channel and the framed outbound data packets within a second logical channel for transmission over a first communication link from a host to a modem;
receiving framed inbound packets over the first communication link from the modem, the framed inbound packets including framed event packets within a third logical channel multiplexed with framed inbound data packets within a fourth logical; and
providing circuit-switched communications including attention (AT) commands from the host to the modem over a second communication link.

30. The article of claim 29 wherein the instructions, when further executed by the computing platform, result in:
removing framing from the received packets, routing the command packets to a command handler, and routing the outbound data packets to a data packet relay,
providing the AT commands to the command handler, and
receiving, by a communications protocol stack of the host, the outbound data packets from the data packet relay and receives the circuit-switched communications from the stream router.

31. The article of claim 30 wherein the instructions, when further executed by the computing platform result in:
adding a flag, a sequence number, a payload length and a check field to a packet, the flag to identify whether the packet is one of the command packets or one of the outbound data packets.

32. An article comprising a storage medium having instructions stored thereon that when executed by a computing platform result in:
framing command packets and outbound data packets;
multiplexing the framed command packets and the framed outbound data packets over a communication link from a host to a modem;

receiving framed inbound packets over the communication link from the modem, the framed inbound packets including framed event packets multiplexed with framed inbound data packets;

initializing a controller interface between the host and the modem, wherein initializing includes:

generating a protocol initialization command packet that includes an initialization command;

framing the protocol initialization command packet; and sending the framed protocol initialization command packet to the modem over the communication link, the modem being responsive to the protocol initialization command packet at least by resetting a sequence number for a plurality of logical channels, setting a maximum packet payload size for communications over a communication interface, and by sending an event packet to the host to indicate completion of the initialization command.

* * * * *

UNITED STATES PATENT AND TRADEMARK OFFICE
CERTIFICATE OF CORRECTION

PATENT NO. : 7,110,371 B2 Page 1 of 1
APPLICATION NO. : 10/229499
DATED : September 19, 2006
INVENTOR(S) : Monroe et al.

It is certified that error appears in the above-identified patent and that said Letters Patent is hereby corrected as shown below:

On the Title page, in item (56), under "Foreign Patent Documents", in column 2, line 1, after "12/1999" insert -- H04L 12/46 --.

In column 12, line 54, in Claim 4, after "modem" insert -- , --.

In column 15, line 28, in Claim 23, delete "logical;" and insert -- logical channel; --, therefor.

In column 16, line 41, in Claim 29, delete "logical;" and insert -- logical channel; --, therefor.

Signed and Sealed this

Nineteenth Day of December, 2006

JON W. DUDAS
*Director of the United States Patent and Trademark Office*